(12) United States Patent
Hazrati-Ashtiani et al.

(10) Patent No.: US 11,077,731 B2
(45) Date of Patent: Aug. 3, 2021

(54) VERTICAL HI-RAIL DEVICE

(71) Applicant: TECHNOLOGIE CONTINENTAL RAILWORKS I INC. / CONTINENTAL RAILWORKS TECHNOLOGY I INC., Saint-Laurent (CA)

(72) Inventors: Iman Hazrati-Ashtiani, Montreal (CA); Francois Aube, Montreal (CA)

(73) Assignee: TECHNOLOGIE CONTINENTAL RAILWORKS I INC. / CONTINE, Saint-Laurent (CA)

( * ) Notice: Subject to any disclaimer, the term of this patent is extended or adjusted under 35 U.S.C. 154(b) by 548 days.

(21) Appl. No.: 16/020,367

(22) Filed: Jun. 27, 2018

(65) Prior Publication Data

US 2018/0370309 A1    Dec. 27, 2018

Related U.S. Application Data

(60) Provisional application No. 62/622,342, filed on Jan. 26, 2018, provisional application No. 62/557,817, filed on Sep. 13, 2017, provisional application No. 62/525,241, filed on Jun. 27, 2017.

(51) Int. Cl.
*B60F 1/04*     (2006.01)
*B60F 1/02*     (2006.01)
*B61K 5/02*     (2006.01)

(52) U.S. Cl.
CPC ............... *B60F 1/043* (2013.01); *B60F 1/02* (2013.01); *B60F 2301/04* (2013.01); *B60F 2301/10* (2013.01); *B61K 5/02* (2013.01)

(58) Field of Classification Search
CPC ...... B60F 1/00; B60F 1/02; B60F 1/04; B60F 1/043; B60F 1/046; B60F 2301/10; B61K 5/02
See application file for complete search history.

(56) References Cited

U.S. PATENT DOCUMENTS 3,980,025 A * 9/1976 Olson, Sr. ............... B60F 1/043
                                                    105/72.2
4,534,297 A * 8/1985 Johnson, Sr. ........... B60F 1/043
                                                    105/215.2

(Continued)

*Primary Examiner* — Jason C Smith
(74) *Attorney, Agent, or Firm* — Benoit & Cote, Inc.; Mathieu Miron

(57) ABSTRACT

There is described a hi-rail device for mounting on a vehicle, comprising a linkage between an axle assembly for holding wheels and a mounting assembly. The linkage, pivotally connected to an upper pivot connection thereof, is foldable and unfoldable to translate the axle assembly relative to the upper pivot connection. An active suspension between the linkage and the mounting assembly is provided and comprises a suspension body to swivel about the mounting assembly, actuated by a spring proximally urging on the suspension body to provide the swivel. The suspension body comprising the upper connection to the linkage, which can move along with the suspension body to provide active suspension. Also, a locking pin, extending through the linkage, can be locked in a slot using a hydraulic cylinder, distinct from a hydraulic cylinder for deployment, and which comprises a spring for default locking not involving hydraulic power.

16 Claims, 13 Drawing Sheets

(Compressed) Rail Position

(56) References Cited

U.S. PATENT DOCUMENTS

| | | | | |
|---|---|---|---|---|
| 4,583,465 | A * | 4/1986 | Powell, Sr. | B60F 1/043 |
| | | | | 105/215.1 |
| 5,154,124 | A * | 10/1992 | Madison | B60F 1/043 |
| | | | | 105/72.2 |
| 5,802,980 | A * | 9/1998 | Hofmiller | B61D 15/00 |
| | | | | 105/215.2 |
| 5,868,078 | A * | 2/1999 | Madison | B60F 1/043 |
| | | | | 105/72.2 |
| 6,298,792 | B1 * | 10/2001 | Jackson, Jr. | B61D 15/00 |
| | | | | 105/215.1 |
| 2006/0027136 | A1 * | 2/2006 | Hunzinger | B61D 15/00 |
| | | | | 105/72.2 |
| 2009/0101042 | A1 * | 4/2009 | Foote | E02F 9/022 |
| | | | | 105/215.1 |
| 2018/0118236 | A1 * | 5/2018 | Aube | B60F 1/005 |
| 2018/0319233 | A1 * | 11/2018 | Fourie | B60F 1/043 |
| 2018/0370309 | A1 * | 12/2018 | Hazrati-Ashtiani | B60F 1/02 |
| 2019/0263205 | A1 * | 8/2019 | Mascola | B60F 1/04 |
| 2019/0329615 | A1 * | 10/2019 | McMahon | G01G 23/20 |

* cited by examiner (Retracted) Road Position

VERTICAL HI-RAIL DEVICE

CROSS-REFERENCE TO RELATED APPLICATIONS

This application claims priority and the benefit of U.S. provisional patent application No. 62/525,241, filed Jun. 27, 2017; of U.S. provisional patent application No. 62/557,817, filed Sep. 13, 2017, and of U.S. provisional patent application No. 62/622,342, filed Jan. 26, 2018, the specifications of which are hereby incorporated herein by reference in their entireties.

BACKGROUND

(a) Field

The subject matter disclosed generally relates hi-rail vehicles, also known as road-rail vehicles. More specifically, it relates to a device to be installed on a road vehicle for driving on rails.

(b) Related Prior Art

Hi-rail vehicles are vehicles known to be operable on both rail tracks and road, hence their name: hi-rail, high-rail, or road-rail vehicles.

In practice, hi-rail vehicles are often normal road vehicles, such as a pick-up truck or a specialized vehicle (tractor, excavator, etc.), converted into a hi-rail vehicle by adding a hi-rail device to the vehicle to allow the vehicle to drive on rail tracks.

Hi-rail devices typically comprise a mechanism rotating the wheels from a road position to a rail position. When the rotation mechanism is actuated, the rail wheels are moved from a position in which they are stowed, e.g., under the vehicle, into a position in which they are deployed on the rail tracks. This rotation movement involves a rotation of the rail wheel assembly, which is typically not stowed in the same orientation as the expected vertical orientation it has when used on rail tracks. The rotary movement of this mechanism is bulky and may prevent the addition of other specialized equipment on the hi-rail vehicle.

There are vertical hi-rail devices which aim at reducing the extent to which the stowed wheels and related mechanism occupy space underneath the vehicle. Vertical hi-rail devices avoid rotating the wheels for stowing or deployment, and rather provide a vertical (up-down) movement of the wheel assembly, and no rotation thereof, in the same circumstances. This allows a reduction of the longitudinal mounting envelope, and therefore offers more space for mounting other equipment on the vehicle.

As for other transportation means, safety issues are taken seriously and various aspects of vertical hi-rail devices need to be improved to ensure maximum safety to the drivers of hi-rails. Improved design simplicity and ease of use are also contemplated.

SUMMARY OF THE INVENTION

According to an embodiment, there is provided a hi-rail device comprising:
  an axle assembly for holding wheels;
  a mounting assembly for mounting on a vehicle, the mounting assembly comprising a locking slot, the locking slot comprising a first locking end and a second locking end;
  a linkage between the axle assembly and the mounting assembly, the linkage being foldable and unfoldable to translate the axle assembly relative to the mounting assembly;
  a locking pin movable in translation within the locking slot;
  a locking cylinder pivotally connected from an inclined arm, extending from the linkage to the locking pin, the locking cylinder comprising a spring to urge the locking pin into an abutting surface of any one of the first locking end and the second locking end when the locking pin is in any one of the first locking end or the second locking end, thereby locking the linkage.

The hi-rail device may further comprise a deployment hydraulic cylinder which is connected from the axle assembly to a hinge of the linkage to unfold the linkage upon extension of the deployment hydraulic cylinder and to fold the linkage upon retraction of the deployment hydraulic cylinder.

The linkage may comprise a first pair of arms and a second pair of arms defining the hinge on which the deployment hydraulic cylinder is connected, the linkage further comprising a third pair of arms, the third pair of arms comprising the inclined arm to which the locking cylinder is pivotally connected.

The mounting assembly may comprise a portion for mounting on the vehicle which is distinct from a wall comprising the locking slot, the mounting assembly further comprising a spring, positioned between the portion for mounting on the vehicle and the wall comprising the locking slot, to provide a suspension within the mounting assembly.

According to another embodiment, there is provided hi-rail device comprising:
  an axle assembly for holding wheels, the axle assembly comprising a locking slot, the locking slot comprising a first locking end and a second locking end;
  a mounting assembly for mounting on a vehicle;
  a linkage between the axle assembly and the mounting assembly, the linkage being foldable and unfoldable to translate the axle assembly relative to the mounting assembly;
  a locking pin movable in translation within the locking slot;
  a locking cylinder pivotally connected from an inclined arm, extending from the linkage to the locking pin, the locking cylinder comprising a spring to urge the locking pin into an abutting surface of any one of the first locking end and the second locking end when the locking pin is in any one of the first locking end or the second locking end, thereby locking the linkage.

The hi-rail device may further comprise a deployment hydraulic cylinder which is connected from the axle assembly to a hinge of the linkage to unfold the linkage upon extension of the deployment hydraulic cylinder and to fold the linkage upon retraction of the deployment hydraulic cylinder.

The linkage may comprise a first pair of arms and a second pair of arms defining the hinge on which the deployment hydraulic cylinder is connected, the linkage further comprising a third pair of arms, the third pair of arms comprising the inclined arm to which the locking cylinder is pivotally connected.

The hi-rail device may further comprise a suspension assembly between the mounting assembly and the linkage, the suspension assembly comprising walls to provide an upper pivot point for the linkage and a spring, positioned between the portion for mounting on the vehicle and the walls that provide the upper pivot point for the linkage, to provide a suspension within the mounting assembly.

According to another embodiment, there is provided a hi-rail device comprising:

a mounting assembly for mounting on a vehicle;
a linkage between an axle assembly for holding wheels and the mounting assembly, the linkage being pivotally connected to an upper pivot connection thereof, and foldable and unfoldable to translate the axle assembly relative to the upper pivot connection;
an active suspension between the linkage and the mounting assembly, the active suspension comprising:
a suspension body which has a swivel connection to the mounting assembly to swivel thereabout;
a spring proximally mounted on the mounting assembly and distally urging on the suspension body to provide the swivel about the swivel connection;
the suspension body comprising the upper pivot connection to the linkage, which can move along with the suspension body to translate the linkage.

The spring may be a compression spring urging the suspension body outwardly with respect to the mounting assembly.

The suspension body may comprise a spring wall to which the spring is distally fastened for urging the suspension body outwardly with respect to the mounting assembly.

The suspension body may further comprise side walls to which the spring wall is fastened, the side walls comprising the swivel connection to the mounting assembly.

The side walls may comprise the upper pivot connection to the linkage.

The spring may distally urge onto the spring wall at a first angular position with respect to a center of rotation at the swivel connection, the side walls comprising the upper pivot connection to the linkage at a second angular position with respect to the center of rotation at the swivel connection, wherein the second angular position is below the first angular position of about 45° to 135°, such that an outward movement of the spring wall causes a downward movement of the upper pivot connection to the linkage, thus actively pushing the linkage downwardly.

The axle assembly may comprise a locking slot, the locking slot comprising a first locking end and a second locking end, the linkage comprising arms defining a hinge making the linkage foldable and unfoldable, at least one of the arms comprising an inclined arm portion extending away from the hinge of the linkage, the hi-rail device further comprising:

a locking pin movable in translation within the locking slot;
a locking cylinder pivotally connected to the inclined arm portion, extending from the linkage to the locking pin, the locking cylinder comprising a locking spring to urge the locking pin into an abutting surface of any one of the first locking end and the second locking end when the locking pin is in any one of the first locking end or the second locking end, thereby locking the linkage.

The at least one of the arms comprising the inclined arm portion comprises an opening for the locking pin that locks the at least one of the arms when the locking pin is locked.

The hi-rail device may further comprise a deployment hydraulic cylinder which is connected from the axle assembly to the hinge of the linkage to unfold the linkage upon extension of the deployment hydraulic cylinder and to fold the linkage upon retraction of the deployment hydraulic cylinder.

The linkage may comprise a first pair of arms and a second pair of arms defining the hinge on which the deployment hydraulic cylinder is connected, the linkage further comprising an additional arm belonging to the at least one of the arms comprising the inclined arm portion.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
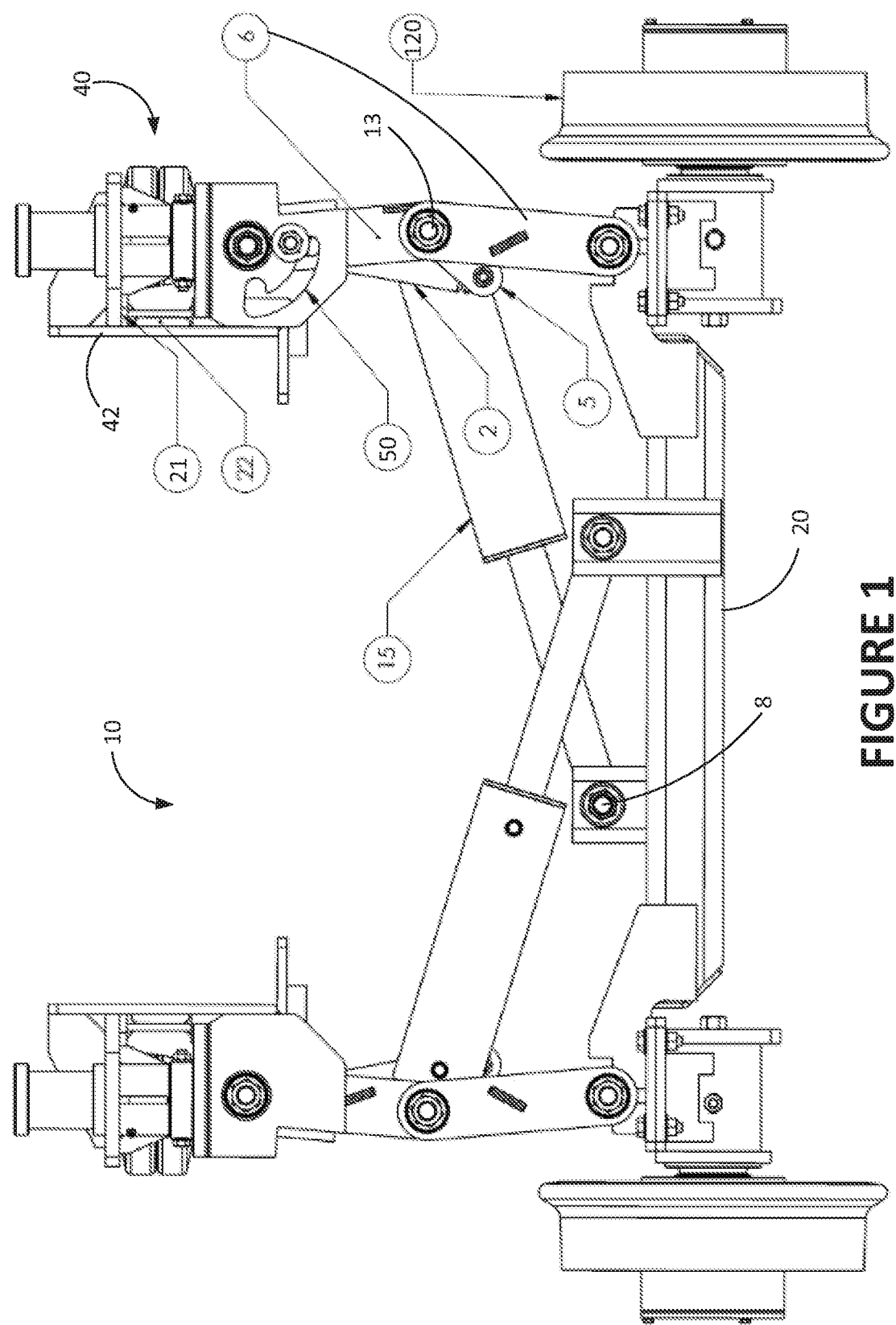
FIG. 1 is a front perspective view illustrating a hi-rail device, according to an embodiment of the present invention.
Figure 2A:
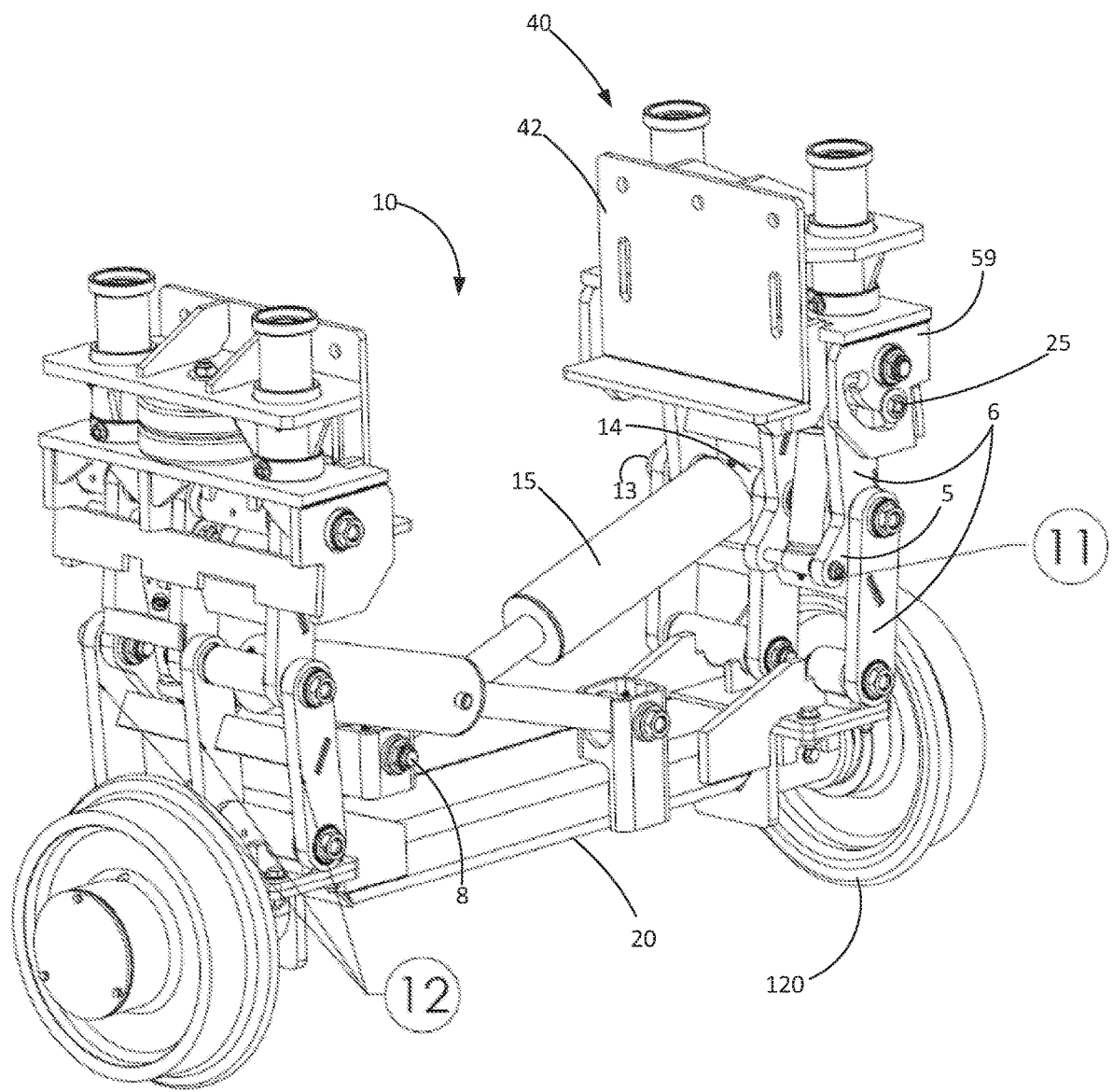
FIG. 2A is a front perspective view illustrating a hi-rail device deployed in rail position, according to an embodiment of the present invention.
Figure 2B:
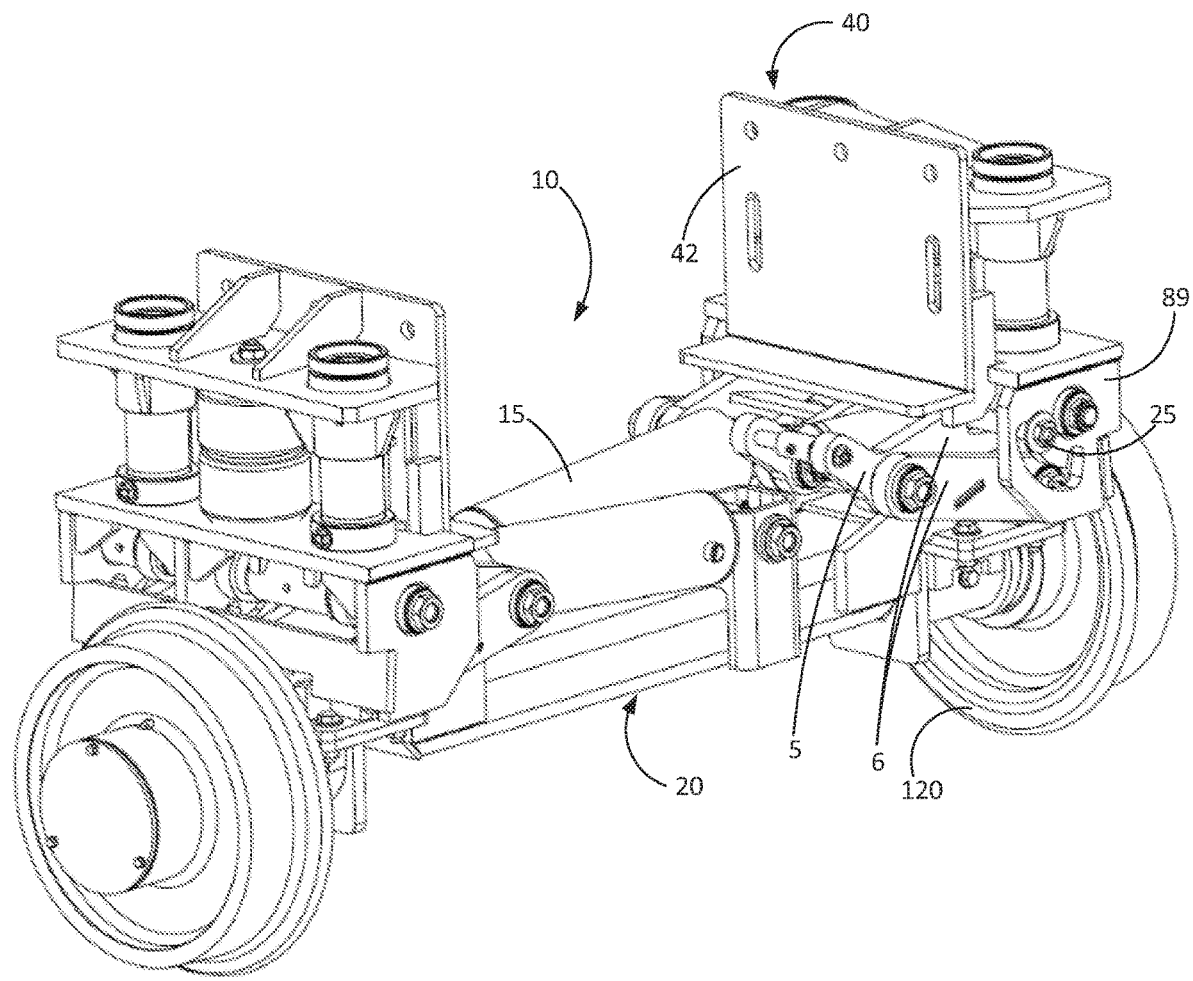
FIG. 2B is a front perspective view illustrating a hi-rail device stowed in road position, according to an embodiment of the present invention.

Referring to FIGS. 1, 2A and 2B, there is shown a hi-rail device 10. The hi-rail device 10 is a device that is usually provided as one or two units installed on the front and/or on the back of a vehicle (e.g., a heavy truck or a pick-up truck) to allow the vehicle to travel on rail. Though the vehicle is generally still propelled by the rubber tires, it is the rail wheels of the hi-rail device 10 that provide guidance (hence the equivalent term "guide wheel"), allowing the vehicle to remain on the rail track even though the rubber tires on the rail are the ones providing propulsion. This vertical hi-rail device 10 is well suited for use at the rear of the vehicle, although it can be adapted, by adjusting cylinder and linkage lengths compared to the proportions shown in the figures, to be placed behind or underneath the chassis cab of the duty truck. In cases where reducing the hi-rail wheelbase is recommended, this type of hi-rail device would be an alternative to the front hi-rail device that is generally placed ahead of the vehicle's front axle.

The hi-rail device 10 can adopt two positions: in can be deployed into a rail position, as shown in FIG. 2A, and stowed into a road position, as shown in FIG. 2B. In the former case, flanged rail wheels 120 extend downwardly to contact the rail tracks, while in the latter case, the rail wheels 120 are lifted up (i.e., vertically translated) to avoid contact with the road so the vehicle can move on its tires only. The rail wheels 120 can support some of the weight of the vehicle (usually a similar portion to that of each rear axle on a truck). This is usually (but not necessarily) a secondary function as the primary function of the rail wheels is to serve as guide wheels to prevent derailing when moving on rail tracks.

The purpose of a vertical hi-rail device, as opposed to a typical "rotary" unit, is to allow for more space, creating room for crane bolts, tool boxes, and other similar equipment. The exact location where to mount the hi-rail is flexible, because the structure allows the device to be moved slightly closer or further from the rubber tires according to the situation.

For safety reasons, the hi-rail device 10 needs to be locked in place in both positions. While hi-rail devices usually depend on the manual insertion of a pin or release of a cable or hook to be locked in a given position, the hi-rail device 10 described herein can be locked automatically in a purely mechanical fashion and, advantageously, not relying on any manually-engaged mechanism that the user could forget to engage.

As shown in FIGS. 1 and 2A-2B, the hi-rail device 10 comprises a mounting assembly 40, which is mounted on and fixed with respect to the vehicle, for example attaching a mounting plate 42 to the vehicle, and an axle assembly 20 holding the wheels 120. The axle assembly 20 can translate up and down with respect to the mounting assembly 40 to switch between the rail position and the road position. A linkage 12 is provided between the axle assembly 20 and the mounting assembly 40. The linkage 12 is mechanically connected to these two assemblies to provide the relative movement of translation between them. There are actually two sets of linkages 12, one on either side of the hi-rail device 10, but since they are preferably identical, they will be described in a singular form for ease of description (the same applies to the mounting assembly 40, locking slot 50 and other parts shown as provided in pair, on the left and right sides). The linkage 12 can unfold and extend, or fold up and retract, to provide the switch between the rail position and the road position, and this movement is actuated by deployment cylinders 15 which can be provided in pair, since there are provided two linkages 12 (i.e., one for each guiding wheel on either side of the vehicle). The linkage 12 is pivotally connected to each assembly (20, 40), since the linkage 12 should be allowed to fold up. This requires the linkage 12 to be formed by arms that can rotate with respect to a central hinge within the linkage 12, and consequently, rotate with respect to each assembly during the folding. A locking cylinder 2 provides an additional connection between the linkage 12 and the mounting assembly 40, which is used for locking the linkage 12 in a specific state (deployed or retracted).

The vertical hi-rail device described herein is automatically lockable in a purely mechanical manner not involving hydraulics or human intervention, thanks to the locking cylinder 2 that comprises a spring 19 which urges a locking pin 25 into a locking slot 50. This spring 19 is not hydraulic and does not need to be engaged by human intervention, so it cannot fail due to a hydraulic failure, and it cannot be forgotten by the operator. Hydraulic pressure in the locking cylinder 2 is needed to compress the spring 19 to disengage the lock. Furthermore, according to an embodiment, the vertical hi-rail device 10 comprises a suspension embodied, for example, by a rubber spring 17 (see FIGS. 5 and 6), while being able to vertically oscillate in a safe manner in response to track rail conditions or features such as high crossings or guarded frogs. Another embodiment of a suspension involving a spring actively pushing down the axle assembly 20 is described further below in relation with FIGS. 10-12. According to an embodiment, the linkage 12 is adapted to safely undergo torsion forces, without undergoing mechanical damage, and center the truck back to the expected position in cases where the driver does not perfectly align the vehicle parallel with the track.

Figure 4A:
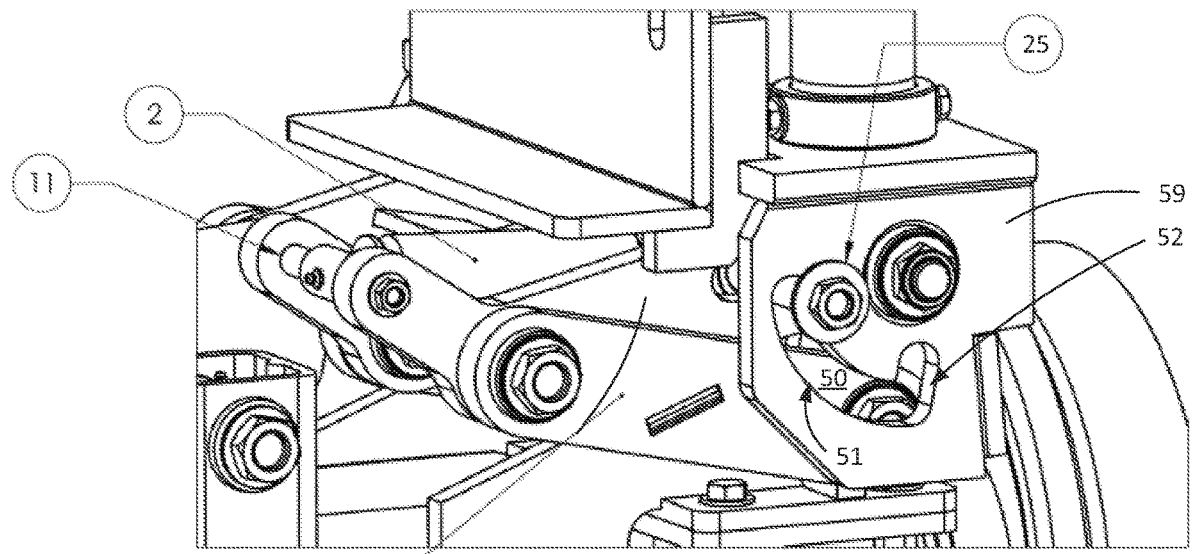
FIG. 4A is a close-up perspective view illustrating a locking mechanism for the hi-rail device stowed in road position, according to an embodiment of the present invention.
Figure 4B:
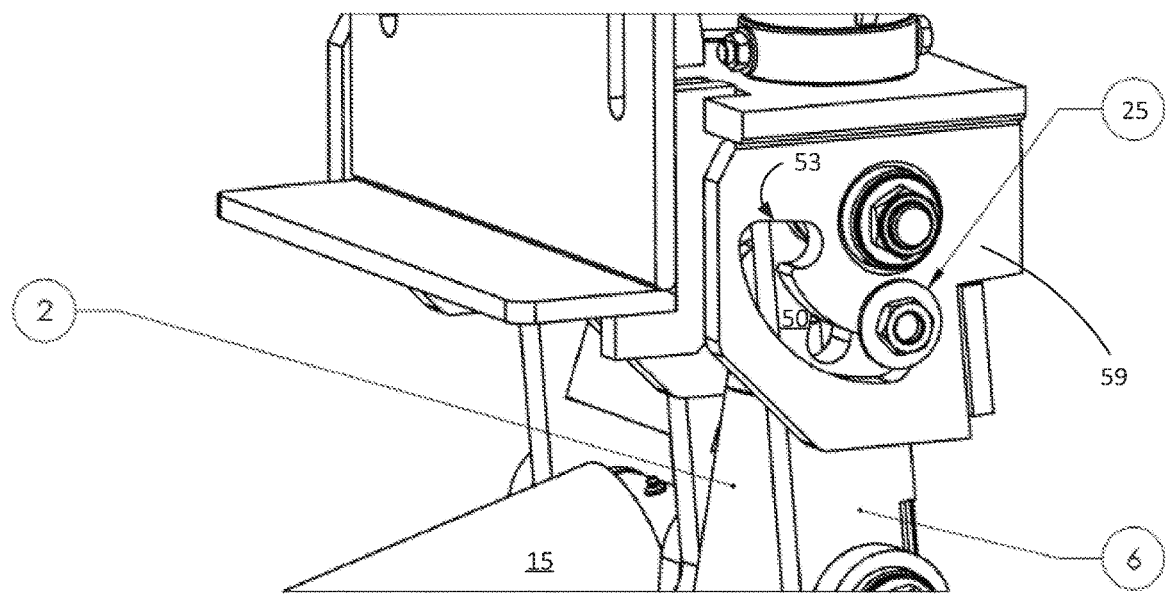
FIG. 4B is a close-up perspective view illustrating a locking mechanism for the hi-rail device deployed in rail position, according to an embodiment of the present invention.

Now referring to FIGS. 4A and 4B, the automatic locking system comprises a locking slot 50 in a wall 59 of the mounting assembly 40, a locking cylinder 2 connecting the triple linkage 12 for preventing it to fold or unfold and actuating a cam having a locking pin 25 confined in the locking slot 50, and a hydraulic circuit powering the locking cylinder 2 and the deployment cylinder 15.

The locking slot is specifically designed so that there is a geometric position where the locking cylinder is extended into the slot to lock it into road position, as well as a position to lock it into rail position. The automatic locking system is automatic in that it does not comprise any manual lock that needs to be acted on by an operator for locking. When the linkage 12 is completely folded or unfolded, the locking cylinder 2 keeps the linkage 12 in that position without any intervention from an operator. This system provides simpler and safer operation since it avoids risks that could arise if an operator were to forget to lock the hi-rail device or need to use force to release the locking pins or cables 10. It also avoids exposure of chains, pins or stoppers to environmental conditions under which they can rust or get more fragile. If further prevents the operator from having to get under the truck to manually engage or disengage the locks.

Figure 3:
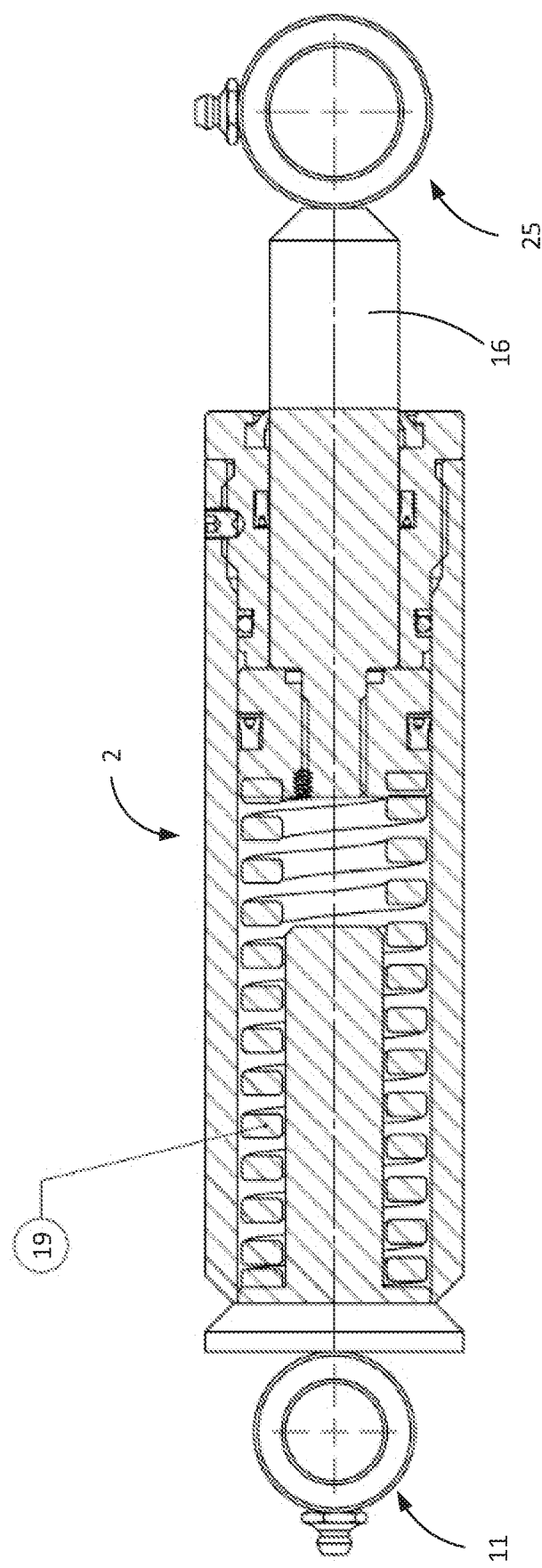
FIG. 3 is a cross section view illustrating a spring in the locking cylinder, according to an embodiment of the present invention.

Now referring to FIG. 3, there is shown a locking cylinder 2 which is a hydraulic cylinder that comprises a spring 19, i.e., it is a single acting spring-extended cylinder. FIG. 3 shows that the compression spring 19 is inside the locking cylinder 2. The spring 19 is, by default, compressed and provided proximally with respect to a piston 16 that extends distally from the locking cylinder 2 (with respect from the central longitudinal axis of the hi-rail device 10 that is considered proximal). When the locking cylinder 2 is at rest (i.e., not being hydraulically powered), the spring 19 naturally urges onto the piston 16 in extension, in a direction corresponding to the longitudinal axis of the locking cylinder 2. The locking cylinder 2 is thus in extension state by default when no hydraulic power is exerted, thanks to the compression spring 19 installed therein. This extension that occurs by default results in the distal end of the locking cylinder 2, comprising a locking pin 25, being urged away from its proximal locking cylinder swivel 11. The locking pin 25 thus extends into the locking slot 50 away from that swivel point, as allowed by the shape of the locking slot that guides the locking pin 25 and limits its movements.

Other embodiments for the spring and cylinder arrangement can be contemplated. For example, the spring 19 could be provided outside the locking cylinder 2 and the piston 16 would comprise shoulders on which the compressed spring 19 would abut, thereby urging the piston 16 in extension. In addition or in replacement of the spring 19 shown in FIG. 3, one might consider using a spring that is rather anchored on the distal end of the piston 16, at the location of the locking pin 25, to push directly onto a body of the locking cylinder 2 toward its proximal swivel point. It is however preferred to provide the spring 19 inside the locking cylinder 2, as a single acting spring-extended cylinder, to prevent damage or deterioration of the spring 19 due to environmental conditions and to ensure that assembling the hi-rail device is not too complicated.

The hi-rail device 10 has two sides (with respect to its central longitudinal axis) and features a single locking cylinder 2 for each side, controlled for example by a hydraulic control valve that drives the locking pin 25 for the hi-rail device 10 to be deployed or stowed. The locking pin 25 is captive in the bushing at the distal end of the locking cylinder 2 and travels only within the locking slot 50 to define its translation trajectory.

The mounting assembly 40 (of a given side of the hi-rail device 10 which has two sides, as mentioned above) comprises a mounting plate 42 for installing and securing the hi-rail device 10 on/under the vehicle at appropriate locations thereon, such as the chassis cab, as mentioned above. The mounting assembly 40 is overall fixed; it does not substantially move with respect to the vehicle.

Referring to the embodiment shown in FIGS. 1-6, the mounting assembly 40 comprises a wall 59 extending in a vertical plane. This plane is geometrically defined as the plane that comprises the vertical and all directions that the locking cylinder can adopt. The wall 59 must be provided in this plane since this is the wall in which the locking slot 50 is formed.

The locking slot 50 is provided in the wall 59 and has three distinct segments: an arc-of-circle portion 51, a lower locking portion 52 (or first locking end), and an upper locking portion 53 (or second locking end), as shown in FIGS. 4A-4B. These three segments form a continuous opening defined by the contour of the locking slot 50 carved in the wall 59. Together, they give to the locking slot 50 a C-shape, where the arc-of-circle portion 51 constitutes the main central portion of the C-shape, and the two ends are the lower locking portion 52 and the upper locking portion 53 which are connected by the arc-of-circle portion 51. The contour of the locking slot 50 serves as a guide for the locking pin 25, which can move only within the bounds of the contour. When the spring locking cylinder 2 pushes on the locking pin 25 or pulls it, the locking pin 25 is urged on the contour which changes the trajectory of the locking pin 25 to follow the shape of the locking slot 50 instead of a purely single-line trajectory.

Indeed, if the locking pin 25 is in the lower locking portion 52, it is locked therein as long as a force pushes it upwardly to prevent dropping. This force is applied by the spring 19 that urges on the locking pin 25 as long as the locking cylinder is not hydraulically actuated. As shown in FIGS. 1 and 2A, the inclined arm 5 supporting the proximal end of the locking cylinder provides the vertical direction of the locking cylinder 2, which thereby pushes upwardly as expected for locking the locking pin 25 in place.

Alternatively, if the locking pin 25 is in the upper locking portion 53, it is held in place and locked therein as long as a force pushes it outwardly toward the side (i.e., the same side as the mounting assembly 40 on the vehicle, or away from the center of the vehicle on which the hi-rail device 10 is installed). This force is applied by the spring 19 that urges on the locking pin 25 as long as the locking cylinder is not hydraulically actuated. As shown in FIG. 2B, the inclined arm 5 supporting the proximal end of the locking cylinder has its end at a location that provides the horizontal direction of the locking cylinder 2, which thereby pushes outwardly toward the side as expected. Preferably, according to an embodiment, the contour of the upper locking portion 53 has at least a slight downward slope to prevent the exit of the locking pin 25 therefrom if spring force ceases, thereby preventing the axle assembly 20 to suddenly and accidentally drop. Indeed, any exit of the locking pin 25 from the upper locking portion 53 would require a slight upward force and the locking pin 25 is held down by the weight of the axle assembly 20.

Therefore, the spring 19 can urge the locking pin 25 into an abutting surface of any one of the lower locking portion 52 (first locking end) and the upper locking portion 53 (second locking end) when the locking pin 25 is in any one of the lower locking portion 52 and the upper locking portion 53. Otherwise, the locking pin 25 is free to move under various forces if it is within the arc-of-circle portion 51, transiting from one state to another under the action of the deployment cylinder 15 that extends to unfold the linkage 12, or retracts to fold the linkage 12, by applying force onto a swivel 14 at the linkage hinge 13.

According to another embodiment, the hydraulic system of the deployment cylinder 15 and the locking cylinder 2 may comprise a plurality of hydraulic components, such as check valves and flow controls. The plurality of hydraulic components can be actuated independently, where incremental steps of the deployment can be individually controlled. In these circumstances, the hydraulic control valves for the deployment cylinders are first actuated, causing the locking cylinders 2 to retract first, then the hi-rail device 10 deploys. The timing of this can be adjusted through the hydraulic components.

In a particular exemplary embodiment, there are two hydraulic control valves which can be actuated independently. When one hydraulic control valve is actuated and the other is not, both locking cylinders 2 release simultaneously and prior to the deployment cylinders 15. When, by acting on the second hydraulic control valve after having done so with the first one, both hydraulic control valves are released, the springs 19 in the locking cylinders then extend. When the hi-rail device 10 deployment cylinders 15 are fully stroked or retracted, the geometry is such that the locking cylinders 2 are set at the correct angle to push back into their locking slots 50.

According to an embodiment, the hydraulic system of the deployment cylinder 15 is powered by a power take-off (PTO) and a hydraulic pump, or an electric-hydraulic powerpack. In some cases the hydraulic system may be shared by other components such as a crane. In such cases, a diverter valve may need to be engaged. Otherwise, pressure is typically applied directly if the hi-rail device 10 is the only hydraulic accessory on the vehicle. When the power is diverted to the hi-rail device 10 for its deployment, the locking cylinder 2 will have its proximal end pulled downwardly and away from the side of the vehicle thanks to the inclined arm 5 that will be described further below. This horizontal component of the movement of the locking cylinder 2 away from the side will retract the locking pin 25 out of the upper locking portion 53. This will allow the hi-rail to deploy, and the locking cylinder will travel along the arc-of-circle portion 51 with the third or "idle" linkage made up of a pair of arms 6, described further below. In all cases (while driving on road, on rail or when using other truck-mounted equipment), there is no pressure/flow going to the hi-rail other than when it needs to be deployed or retracted, so it will always be locked either in road position or rail position.

Once the hi-rail 10 is fully deployed, the unfolded linkage 12 and the locking cylinder 2 will be positioned as described above, with the locking pin 25 locked in the lower locking portion 52, so that when the hydraulic power is switched away from the hi-rail the locking cylinder will automatically spring extend into the "bottom" of the locking slot 50 which is actually the upper portion of the lower locking portion 52 onto which the locking pin 25 abuts when being locked by the spring of the locking cylinder 2, as shown in FIG. 4B. The lock is thus not actuated by a separate valve (which would make the locking system "manual"): when pressure or flow is cut from the system, the spring 16 ensures the locking pins are engaged. Likewise, when the hi-rail is being retracted from the deployed position, the hydraulic power is diverted to the hi-rail device 10, which retracts the locking cylinder 2 and drop from the lower locking portion 52 into the arc-of-circle portion 51, allowing the linkage to travel along the arc-of-circle portion 51 of the locking slot 50 back to the entry of the upper locking portion 53. Once the hi-rail device is completely retracted, the linkage and the locking cylinder will be in the correct position with respect to the locking slot 50, the hydraulic power will be switched off and the spring 19 of the locking cylinder 2 will extend and push the locking pin 25 in the "bottom" of the upper locking portion 53 which is the end toward the direction of the side of the vehicle (i.e., the same side on which the mounting assembly 40 is installed) on which the locking pin 25 abuts, as shown in FIG. 4A.

This allows for the locking to be purely mechanical and not relying on pressure in the locking cylinder 2. Therefore, actuating the locking cylinder 2 unlocks the axle assembly 20 from its current position (road or rail position), translates it to the other position (rail or road position, respectively, and including rotation of internal components within the assembly) and locks it in place, all in one fluid motion.

A deployment hydraulic cylinder 15 is used to extend and retract and therefore indirectly drive the vertical translation of the wheels by having the upper and lower arms of the triple linkage 12 unfold (i.e., extend or deploy) or fold up (i.e., retract or being stowed). More specifically, the hydraulic cylinder 15 is pivotally connected, at its distal end, to a swivel 14 extending between arms of the linkage 12 at the linkage hinge 13, as shown in FIG. 5, and pivotally connected at its proximal end, to a fixed pivot connection 8 on the axle assembly, which is shown in FIG. 1.

The linkages 12 on both sides of the vehicle are driven at their hinge by the deployment hydraulic cylinder 15. This linkage hinge 13 is formed between a plurality of upper arms and a corresponding plurality of lower arms (they are corresponding in that each lower arm is associated with an upper arm, which together form a hinge when paired). While the lower arms are pivotally connected to the axle assembly 20, the upper arms are connected to a cam that can translate within the mounting assembly 40, the cam ending on at least one end with locking pin 25 which is movable in translation, but constrained by the locking slot 50 which acts like a guide rail for the cam. The locking slot 50, formed within the wall 59 of the mounting assembly 40, imprints a predefined trajectory to the locking pin 25 as it is pulled or pushed by the linkage 12 driven by the hydraulic cylinder 15. The locking slot 50 is also shaped to mechanically confine the locking pin in its ends for locking purposes, if the locking cylinder 2, extending from an inclined arm 5 of the linkage 12 to the locking pin 25, is urging on the locking pin 25. The locking cylinder 2 urges the locking pin 25 in the right direction for locking thanks to the inclination of the inclined arm 5 supporting the locking cylinder 2, the inclined arm 5 being a downward extension of some of the upper arms of the linkage having an inclination with respect to the other upper arms of the linkage similar to the end of a hockey stick, as shown in FIGS. 2A and 5. The upper arms of the linkage comprising the inclined arm 5 comprise a slot, shown in FIG. 4A, in which the locking pin 25 goes through to assist in guiding the movement.

Figure 5:
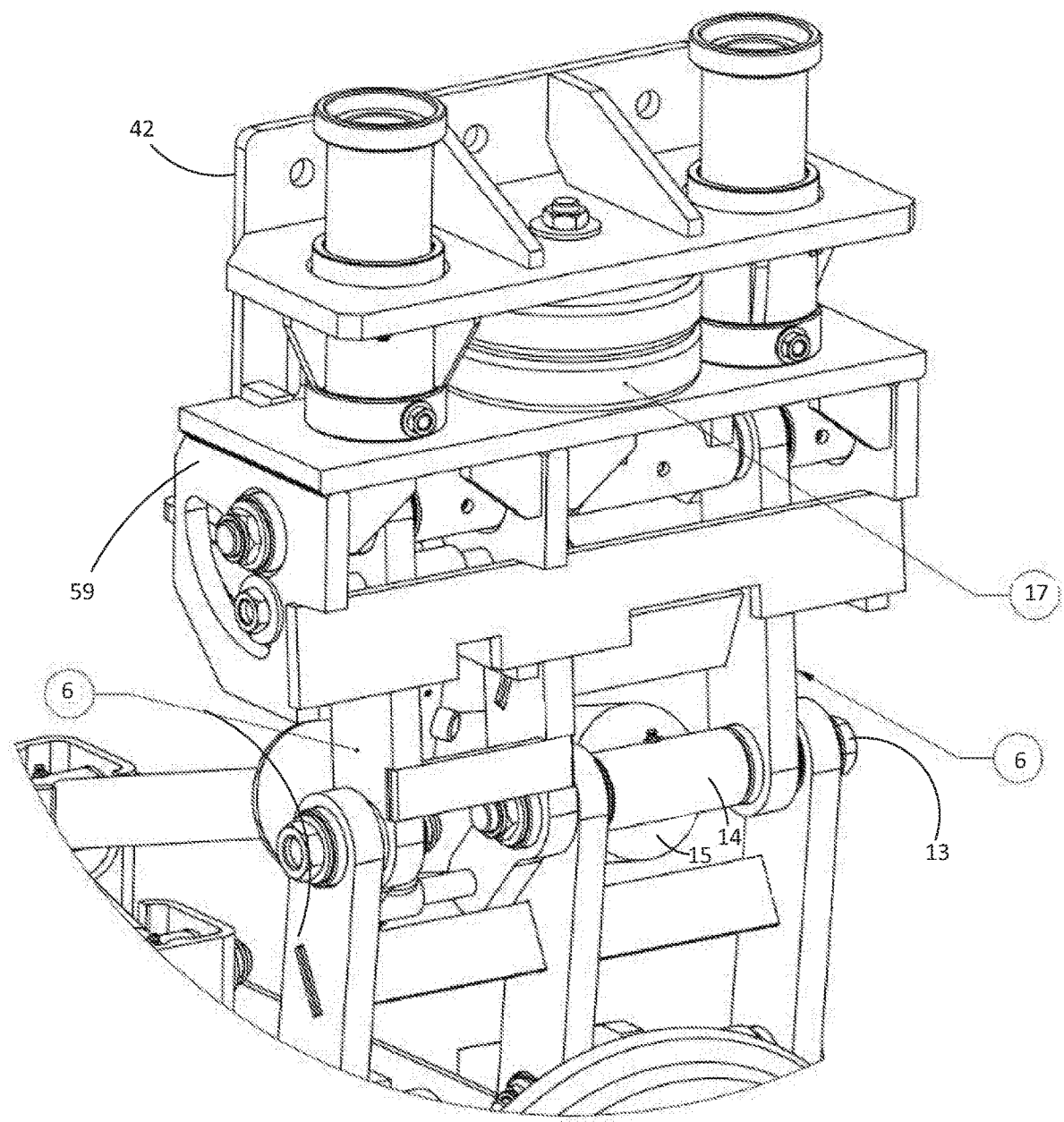
FIG. 5 is a close-up perspective view illustrating a triple linkage for the hi-rail device, according to an embodiment of the present invention.

FIGS. 2A and 5 show the linkage between the deployable assembly and the mount. According to an embodiment, the linkage is a triple linkage 12 that comprises three pairs of arms (i.e., three upper arms and three corresponding lower arms paired together). Together, these three pairs of arms add significant resistance to torsion, and thus greater torsional stability, to the hi-rail system. A linkage with two pairs of arms would theoretically provide the same movement and is typical in the prior art, but such a linkage would be more vulnerable to torsion that could damage the device. Significant torsion forces can arise in various circumstances, e.g., the two deployment cylinders cross each other and produce torsion while deploying. In another example, if the vehicle is steered in a direction that is not well aligned with the rails on which it is being driven, the rail wheels are the only element that keep the vehicle aligned with the rails. In this case, the wheels undergo significant forces that are transmitted by the linkage to the mount of the hi-rail device, the linkage thereby undergoing a torsion force. The third arm, or additional compared to a conventional two-arm linkage, ensures that the linkage 12 can undergo this torsion force without damaging the linkage.

The linkage 12 further comprises an inclined arm 5 which is, according to an embodiment, an arm portion extending downwardly and with an inclination of about 45° from the upper arm of the third pair of arms 6. The inclined arm 5 is preferably integral with the upper arm and is shown as being present on two adjacent upper arms out of the three upper arms of the linkage 12. It provides the required locking cylinder swivel 11, shown in FIG. 2B, to which the locking cylinder 2 is attached, at its proximal end, and around which it is allowed to swivel. This locking cylinder swivel 11 further provides the pathway for the proximal end of the locking cylinder 2, since the locking cylinder swivel 11 moves in space as it is the end of the inclined arm 5 of the upper arm of the third pair of arms 6 of the linkage 12. When the hydraulic cylinder 15 is driven and is extending, it pushes onto the linkage hinge 13 between two of the pairs of arms of the triple linkage 12 toward the lateral side of the high rail device. More precisely, the hydraulic cylinder 15 pushes onto the swivel 14 which swivably connects at least some of the arms at the linkage hinge 13, as shown in FIG. 5.

Since the inclined arm 5 is within the triple linkage 12 at the same linkage hinge 13 aligned with the hinges of the linkage 12 (which allows swiveling around the point), the inclined arm 5 is pushed toward the lateral side of the high rail device and brings the locking cylinder swivel 11 toward that same lateral side. The locking cylinder swivel 11 will however translate in space in a trajectory that depends on the locking cylinder 2 that adds a constraint to the freedom of movement of the inclined arm 5. Nonetheless, the proximal end of the locking cylinder 2 is thus also brought to that same side and brings the whole locking cylinder closer to the side and makes it more vertical, as shown in FIG. 1. The vertical position of the linkage hinge 13 is chosen based on the expected height of the linkage 12. The linkage 12 is of a certain length to provide approximately the appropriate ride height depending on the chassis.

The linkages 12 allow the unit to fold up when in road position, while allowing for maximum ground clearance (i.e., the space between the ground and the wheels when the wheels are stowed). When deploying the device, the linkages on both sides of the device act as levers to allow the hydraulic cylinders 15 to operate and switch positions (stow to road position or deploy to rail position) with a reasonable amount of force.

The linkage 12 is triple because it comprises a third pair of arms 6 compared to the two arms, typical in the prior art, that link the deployment hydraulic cylinder 15 to the guide wheels and to the mount. In the embodiment shown in FIGS. 2A-2B, one deployment hydraulic cylinder 15 is pivotally connected to a "double" linkage, i.e., it is between a pair of upper and lower arms on a first side and a pair of upper and lower arms in the center. The deployment hydraulic cylinder 15 thus drives the linkage 12 by pushing the linkage at that point, where the upper and lower arms are also pivotally connected in order to move from the rail position to the road position and vice versa. A third pair of upper and lower arms 6 is provided on the second side opposite the first side. The locking cylinder 2 is pivotally connected to a hinge between the upper and lower arms, and this connection is between the central pair of arms and the third pair of arms 6 provided on the second side. As shown in FIG. 5, the third pair of arms 6 is idle: it is not directly driven by the deployment hydraulic cylinder 15. The hydraulic cylinder 15 pulls or pushes on the swivel 14 at the linkage hinge 13, the swivel 14 only extending between the first and the second (central) pair of arms in the linkage 12, these arms being thus considered as powered. Indeed, the swivel 14 only extending between two pairs of arms as shown in FIG. 5 ensures that the hydraulic cylinder 15 only powers these pairs of arms, while the third pair of arms, shown on the left in FIG. 5, is driven indirectly when the whole assembly is being folded or unfolded.

Figure 6:
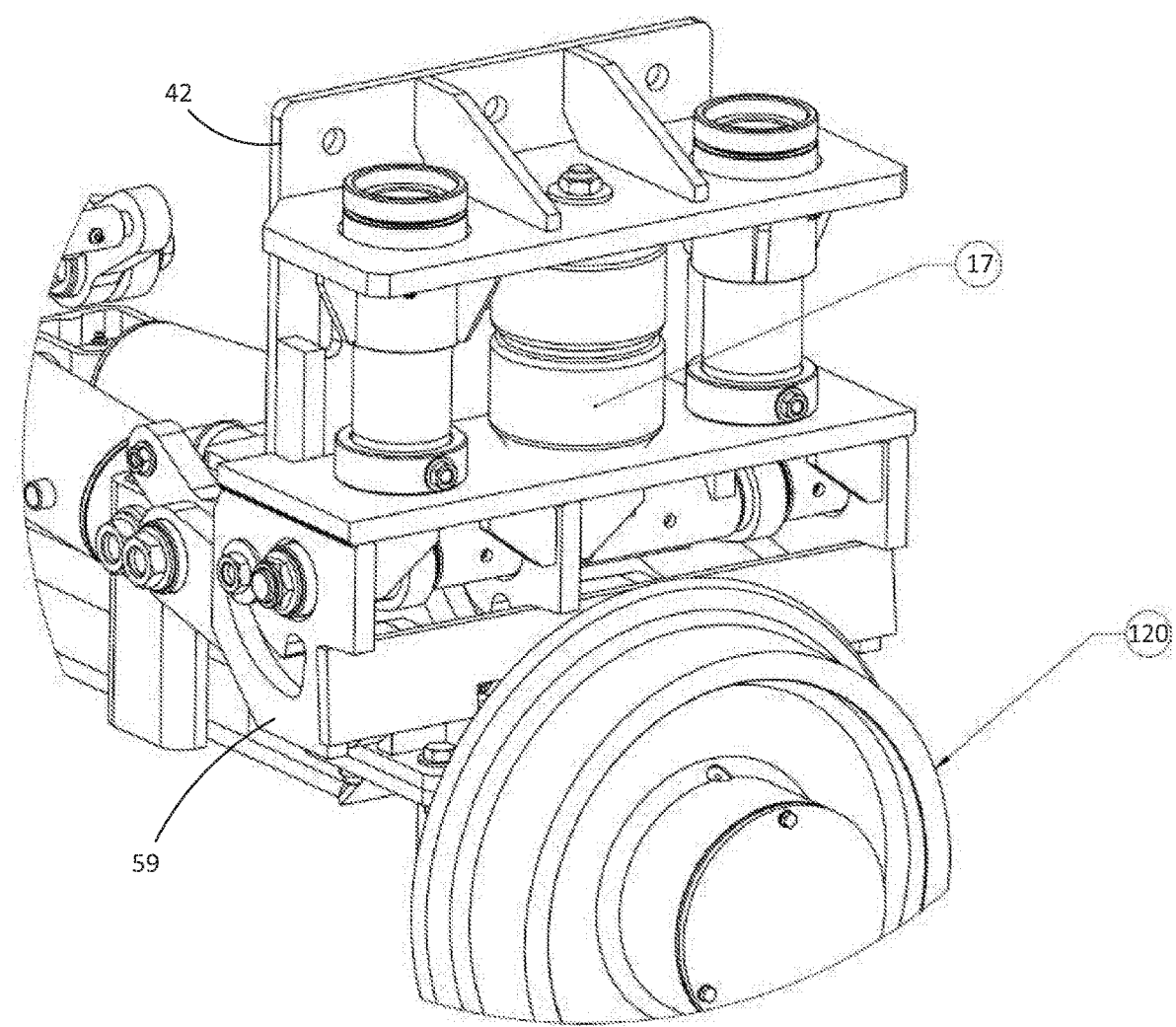
FIG. 6 is a close-up perspective view illustrating a suspension mechanism for the hi-rail device, according to an embodiment of the present invention.

According to an embodiment, there is provided a suspension. The suspension is useful in that it allows for keeping contact between the guide wheel on the hi-rail and the railroad track when the vehicle stumbles while being driven. This is important since the outer tires of the truck can come into contact with items such as high crossings. Without any suspension, the guide wheel can be lifted in response to the mount of the device moving up, and potentially getting out of the rail track, thereby risking derailment. The guide wheels 120 have a movement that is less reactive than the movement of the mounting assembly 40, thanks to a suspension that provides a buffer between the mounting assembly 40, the movement of which dictated by those of the vehicle. The suspension is provided by compressing the rubber spring 17 that is in the upper portion of the hi-rail device, between the two guide tubes, as shown in FIGS. 2A-2B and 5-6. Since the rubber spring 17 is compressed, the suspension helps force the hi-rail wheel downwardly onto the track as the truck lifts under unpredictable environmental forces. FIGS. 5 and 6 illustrate that the rubber spring 17 can extend, thereby pushing the hi-rail device down should it lift, between the mounting plate 42 of the mounting assembly 40 connecting to the vehicle and the wall 59. The mounting plate 42 and the wall 59 are thus distinct, but they have a connection between them that can adapt to shocks and height variations of the vehicle.

According to an embodiment, as part of the suspension, there is provided a plastic slider 22, shown in FIG. 1. The plastic slider 22 is used to provide a way for the hi-rail device to slide up along the mounting plate 42 when the spring is compressed, since FIGS. 5-6 show that substantial vertical movement may exist, thereby requiring a "guide" for the vertical sliding movement.

According to an embodiment, an adjustable suspension stopper 21 may be provided in the suspension system to regulate the pressure on the guide wheel. Indeed, high pressures applied on the guide wheel reduce the pressure between the rubber tires and the ground and, consequently, reduce the traction on the rubber tires propelling the truck. Therefore, an effective balance between the pressure on the guide wheels and that on the rubber tires is needed to get the expected traction.

This pressure can be adjusted by raising or lowering the unit at the mounting plates. According to an embodiment, the pressure can be adjusted by increasing or reducing the height of a suspension stopper, which can be done by increasing or reducing the allowable travel of the guide tubes or of the alternative suspension stopper 21, as shown in FIG. 1. Increasing the height of the suspension stopper 21 or reducing the allowable travel of the guide tube will divert a greater portion of the truck's weight into the guide wheels supported by the hi-rail device. Reducing the height of the suspension stopper 21 will increase the amount of weight on the rubber tires, increasing the traction and decreasing the guidance of the hi-rail wheels. Using the suspension stopper 21 avoids the need for loosening the bolts holding the hi-rail device in place and raising or lowering an entire unit which has considerable weight. Other ways of adjusting height or pressure could also be considered.

Now referring to FIGS. 7 to 12, there is illustrated another embodiment of the hi-rail device 10.

In this other embodiment, the locking slot 50 is now provided at another location on the hi-rail device 10, namely on a wall 57 which is not a part of the mounting assembly 40, but that is rather provided on the axle assembly 20. Indeed, it can be seen, e.g., in FIG. 7, that the locking slot 50 that provides the locking is carved in a wall 57 that is under the linkage 12, by the axle and wheels 120 of the axle assembly 20. The purpose of the wall 57 is the same as the wall 59 of the previous embodiment which comprised the locking slot 50, except that is located in the axle assembly, which implies that some movements are inverted, i.e., the parts that were moving upwardly in the previously described embodiment are now moving downwardly for the same function.

The lock is operated in the same manner using the spring-extended locking cylinder 2 that is able to follow the movement of the cylinders 15, notably if one is deployed before the other, in order to allow the unit to center the truck by grabbing the rail head with the flange of the wheel 120. The locking slot 50 has the same shape as previously described, except that it is upside down.

Figure 7:
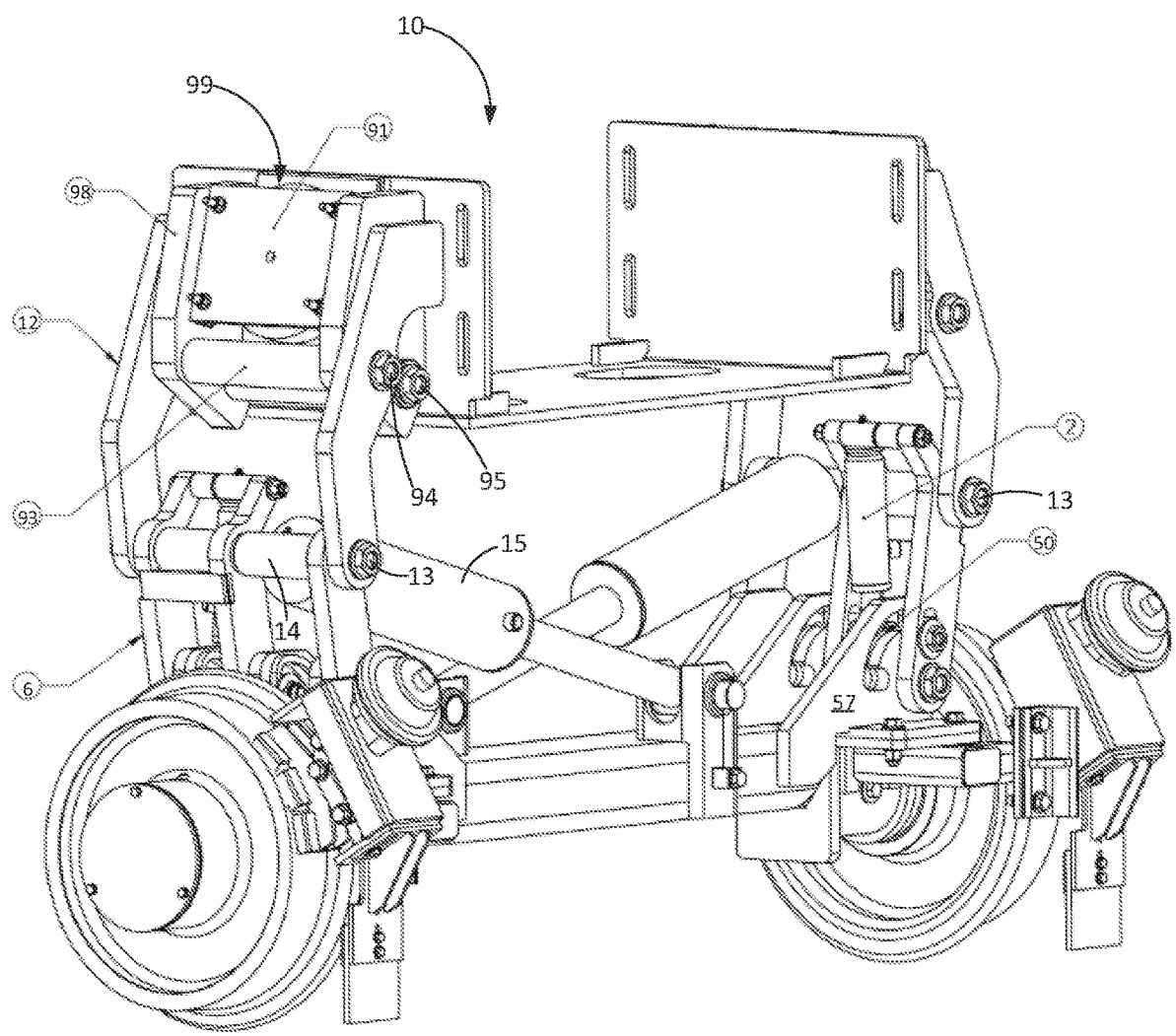
FIG. 7 is a perspective view illustrating a hi-rail device deployed in rail position, according to an embodiment of the present invention.

In this embodiment, the locking pin 25 is captive within a part of the arms of the linkage 6 that is at a lower end thereof. The locking slot 50 is also upside down with respect to the first embodiment described above. It implies that when the hi-rail device 10 is deployed, as shown in FIG. 7 and more closely in FIG. 9, the locking pin 25 is locked in the upper end of the locking slot (and not in the lower end as described above in reference with FIG. 2A). In this particular embodiment, it is located immediately above the lower swivel point of the lower arms in the linkage 12.

Figure 8:
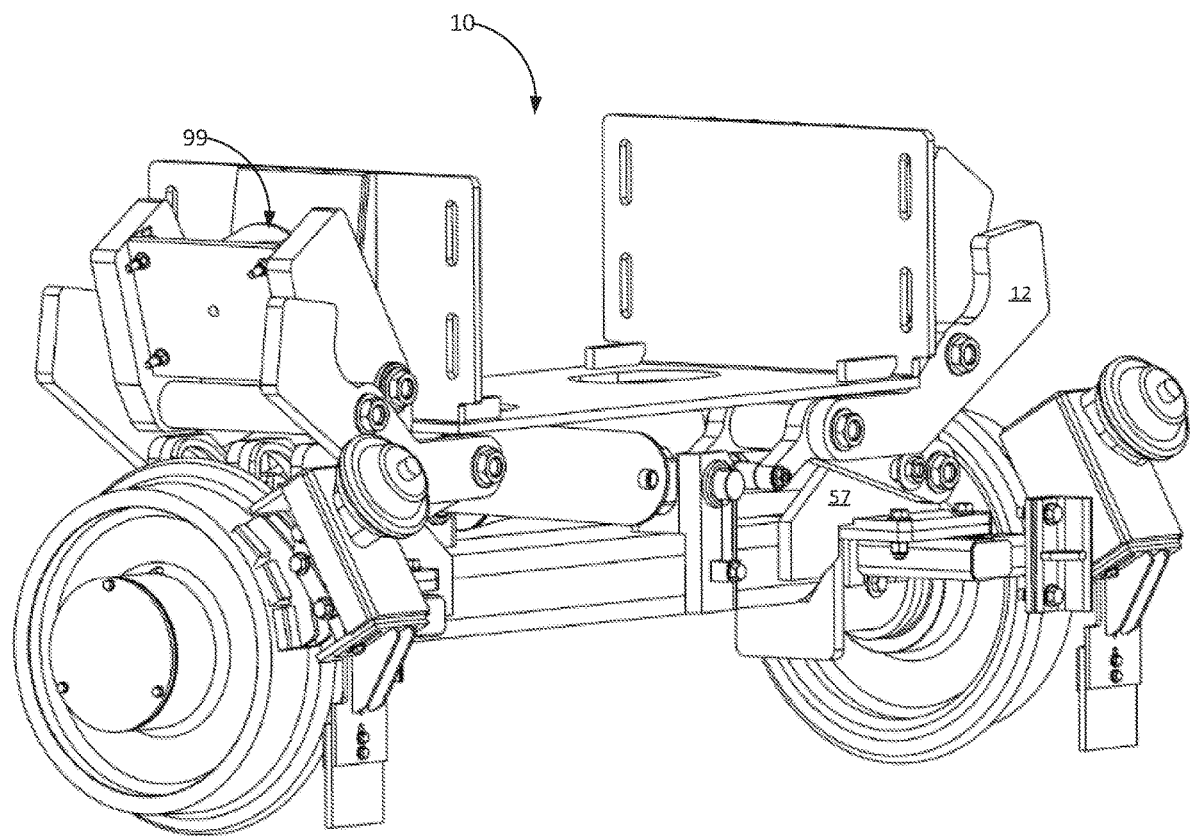
FIG. 8 is a perspective view illustrating the hi-rail device of FIG. 7 stowed in road position, according to an embodiment of the present invention.
Figure 9:
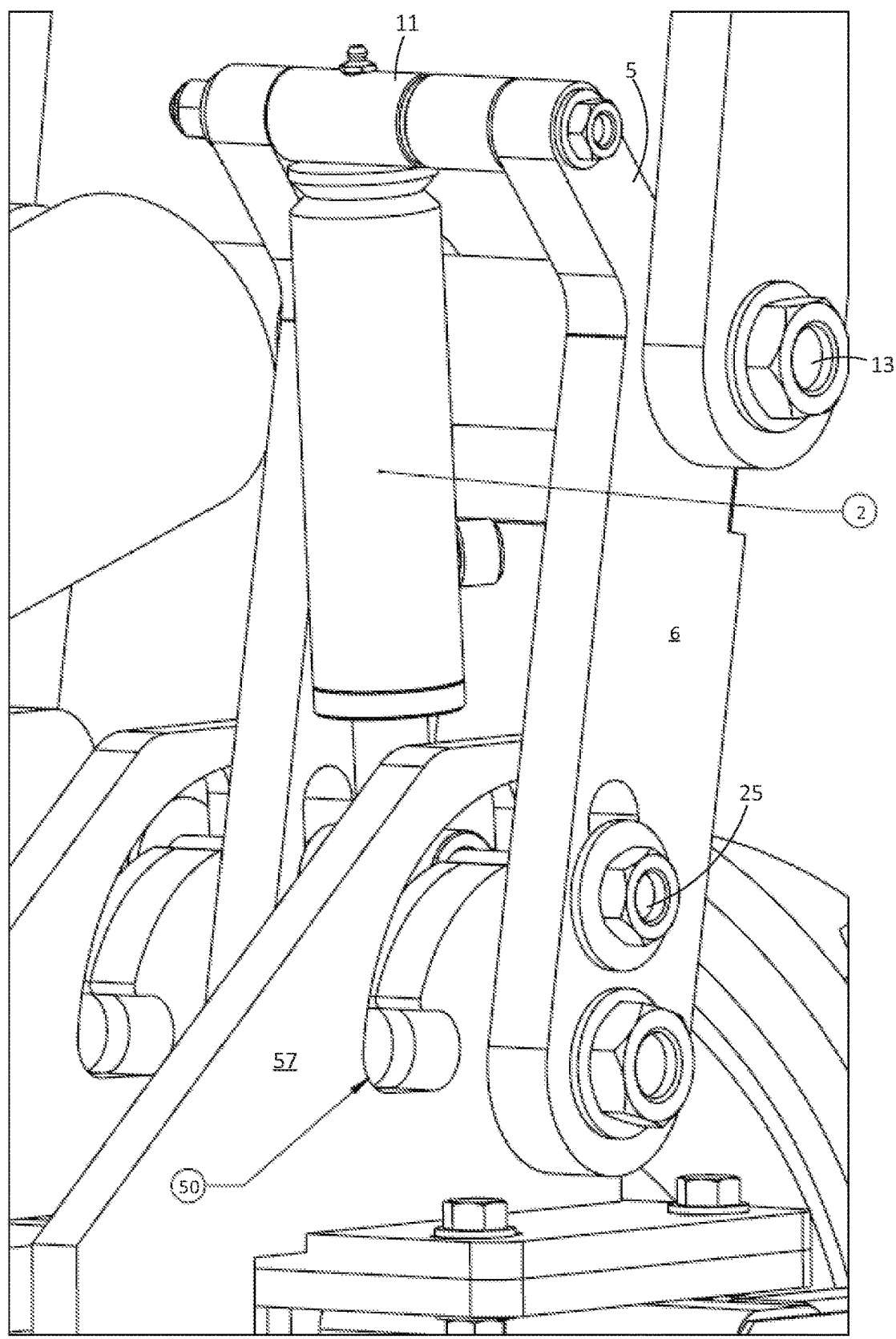
FIG. 9 is a close-up perspective view illustrating the locking cylinder in the hi-rail device of FIG. 7, according to an embodiment of the present invention.

Similarly, when the hi-rail device 10 is retracted, as shown in FIG. 8, the locking pin 25 is locked in the lower end of the locking slot (and not in the upper end as described above in reference with FIG. 2B). The locking in the lower end of locking slot 50 is not particularly apparent in FIG. 8 because of element superposition, however it can be inferred by comparing FIGS. 7 and 8.

Inverting the locking slot 50, in comparison with the embodiment previously described, implies that the third arm 6 of the triple linkage 12 is now provided in the lower set of arms, and not in the upper set of arms, as shown in FIGS. 8-12.

Figure 10:
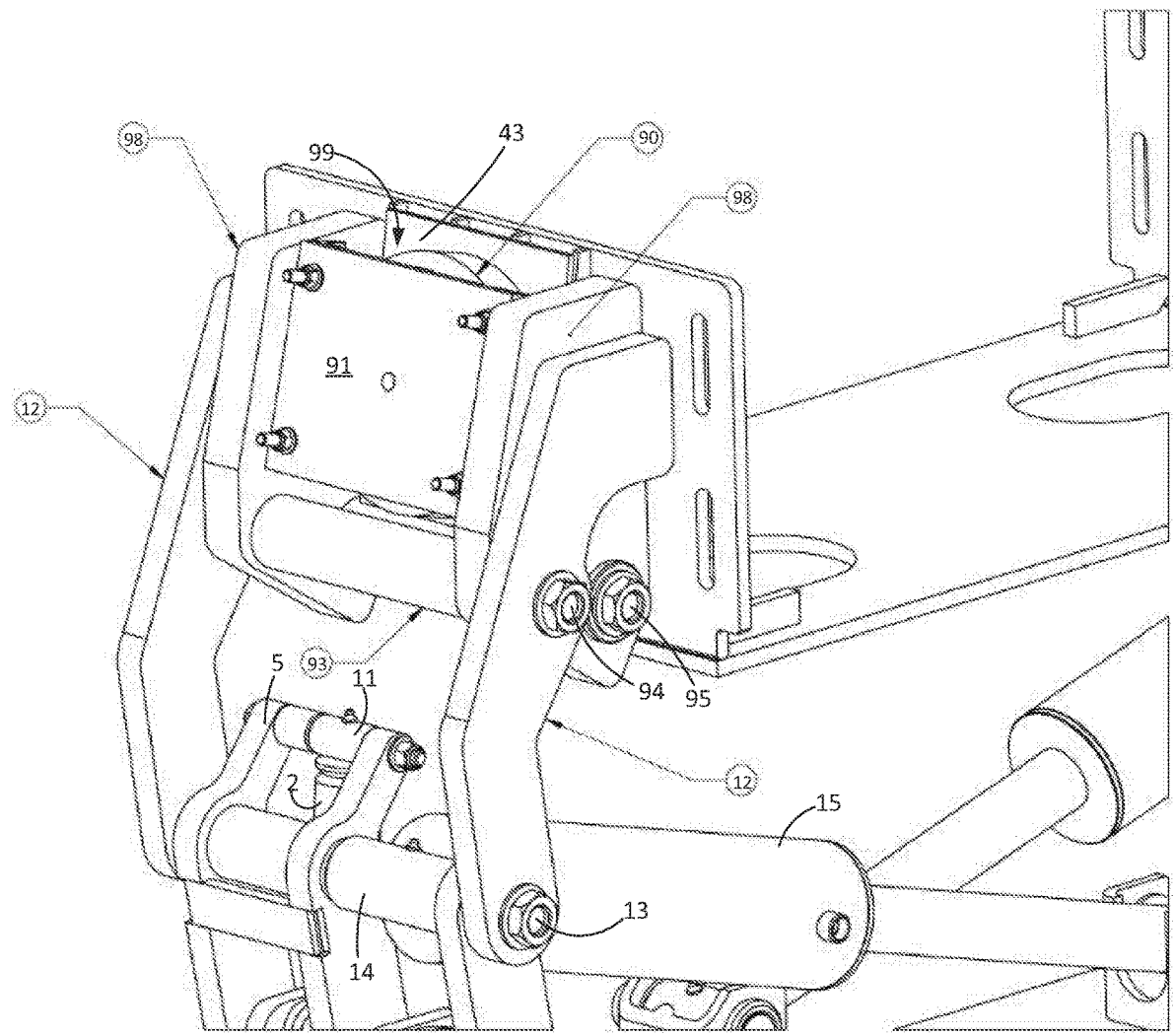
FIG. 10 is a close-up perspective view illustrating the hi-rail device of FIG. 7, deployed in rail position with the suspension compressed, according to an embodiment of the present invention.
Figure 11:
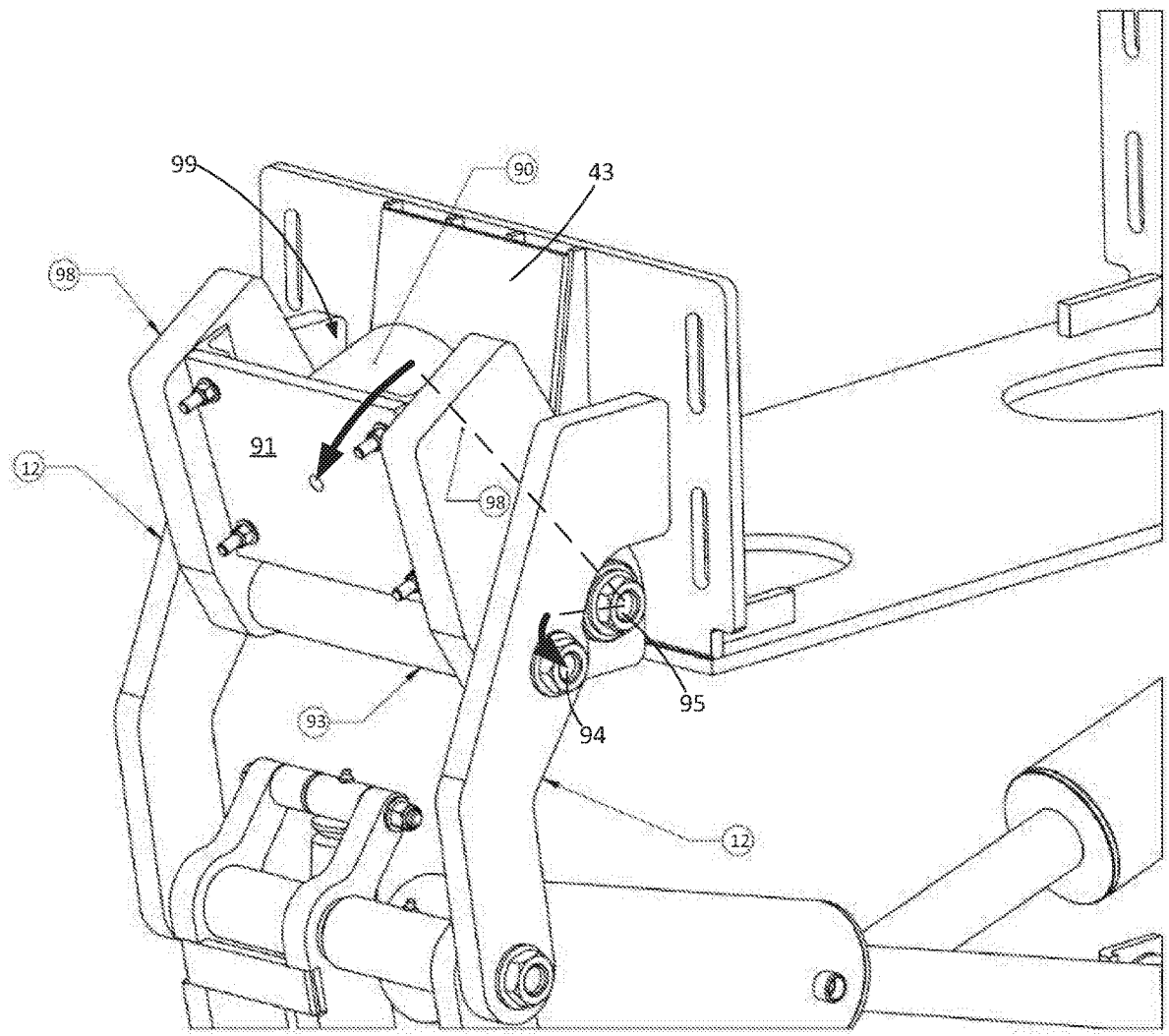
FIG. 11 is a close-up perspective view illustrating the hi-rail device of FIG. 7, deployed in rail position with the suspension actively pushing the axle assembly downwardly toward the rail, according to an embodiment of the present invention.
Figure 12:
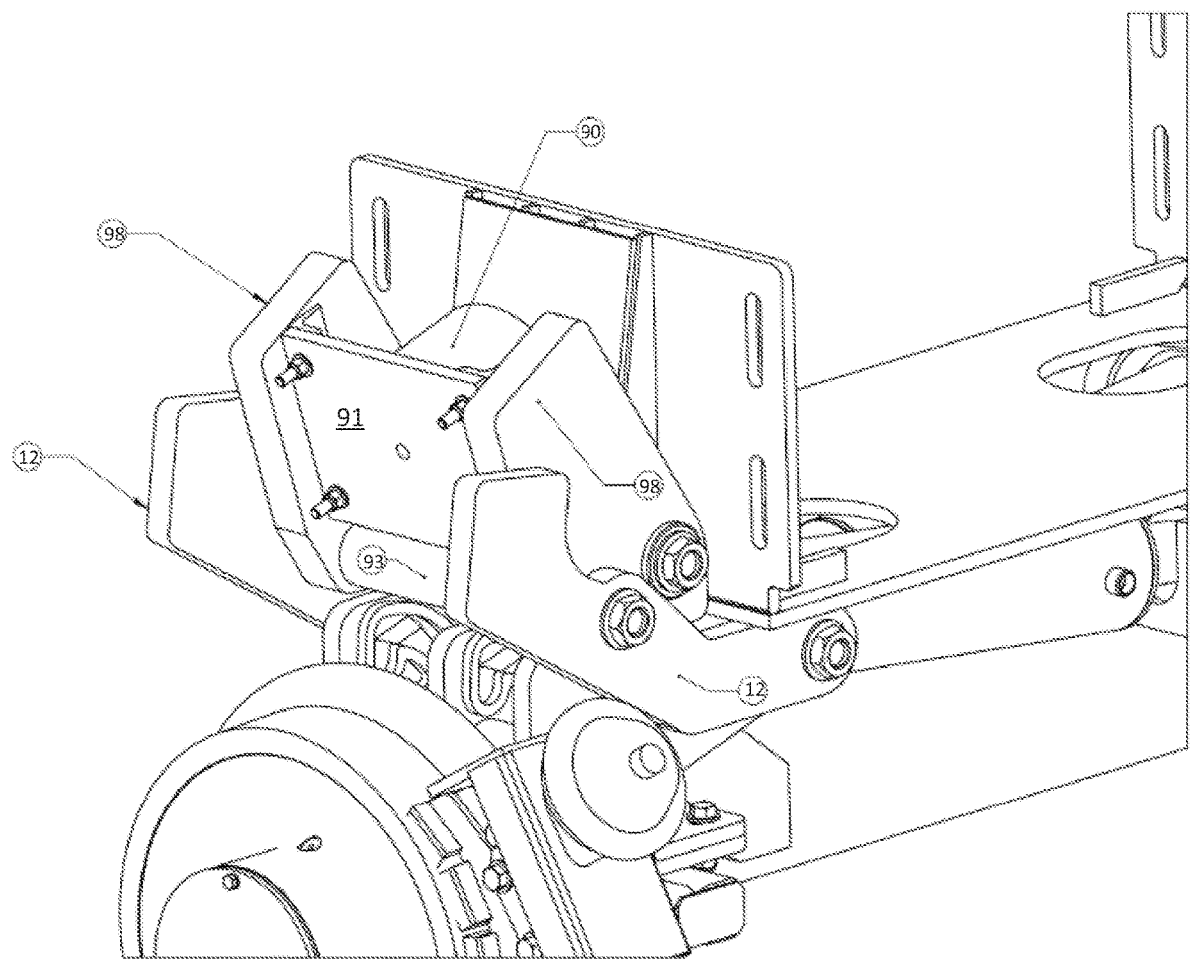
FIG. 12 is a close-up perspective view illustrating the hi-rail device of FIG. 8, stowed in road position, with the suspension unused, according to an embodiment of the present invention.

In this embodiment, and as shown specifically in FIGS. 10-12, there is no guiding tube as described above in reference with the previous embodiment. Instead, the suspension comprises a pivoting mechanism that compresses a spring 90 horizontally against the mounting plate 42 when deployed with weight on it (FIG. 10, hi-rail device deployed but suspension at rest). When the weight is released due to either retraction or hitting a high crossing, the spring 90 expands (FIG. 11, hi-rail device deployed with suspension in action), forcing the upper set of arms in the linkage 12 to pivot in a downward direction, allowing the rail wheel 120 to force down and retain contact with the rail head. The design of the upper set of arms in the linkage 12 is such that as the unit deploys it contacts the reinforced area of the mounting plate creating stability and rigidity. FIG. 12 shows the suspension when the hi-rail device is retracted; the suspension is thus not in use.

It should be noted that this embodiment comprises a wall 98, with no locking slot therein, which is used to provide the upper pivot connection 94 of the upper set of arms of the linkage 12. The upper set of arms of the linkage 12 is held by the upper pivot connection 94 and when the linkage 12 folds, it brings the axle assembly 20 up, translating it toward the upper pivot connection 94. Accordingly, the unfolding of the linkage 12 results in a downward translation. The folding or unfolding requires the upper set of arms of the linkage 12 to rotate with respect to the upper pivot connection 94, hence the pivot connection. Translating the upper pivot connection 94, as discussed more in detail below, does not fold or unfold the linkage 12, but translates the whole assembly of the linkage 12 and the axle assembly 20.

On one side of the hi-rail device, two of these walls 98 are provided, as shown in FIGS. 10-12 which illustrates only a left side of the mounting assembly 40 with the suspension assembly 99 on that side. The suspension assembly 99 comprises the spring 90, distally mounted to the spring wall 91 which is fastened to these two walls 98; together they form the suspension assembly 99 which can swivel with respect to the swivel connection 95. The suspension assembly 99 further comprises a pin 93 installed between the walls 98 to transmit the rotation movement (preferably with a different torque and an angular offset) to move the linkage 12. The walls 98 are thus not directly mounted on the portion for mounting on the vehicle of the mounting assembly 40, but rather connect thereto by a swivel 95 which is the swivel axis of the pair of walls 98 with respect to the mounting portion 43 with respect to which this swivel 95 is provided. For example, both the pair of walls 98 and the mounting portion 43, which has wall portions extending away from the mounting plate 42 parallel to the pair of walls 98, may have circular openings that are aligned and a pin is provided through the aligned openings to form the axis of the swivel 95, with each end of that pin bolted as shown in FIG. 11 (the nut being clearly visible at the swivel point 95). While the proximal end of the spring 90 is secured to the mounting portion 43 (and therefore fixed with respect to the mounting assembly 40), the distal end of the spring 90 is fastened to the spring wall 91 and is movable due to the spring extension. However, since the spring wall 91 is itself fastened to the walls 98 which have a swivable connection at the swivel point 95, the expansion of the spring 90 forces its distal end to undergo a trajectory of an arc of circle with respect to the swivel point 95, as shown in FIG. 11. The pin 93 is comprised between the pair of walls 98 and is brought along in this rotation movement, thus bringing the upper pivot connection 94 of the upper arms of the linkage 12 along in this rotation movement too.

The spring wall 91 is the portion that is fixed to the walls 98 while supporting the spring 90. A pin 93, which can comprise a bushing, links the walls 98 and connects to the linkage 12 through the walls 98, thus providing the upper swivel connection 94 for the linkage 12.

The suspension assembly can comprise a suspension body, in this exemplary embodiment, formed by the spring wall 91, the walls 98 and the pin 93 or other means to pivotally connect to the upper pivot connection 94; and a spring 90 which acts distally on the suspension body (e.g., by being distally fastened thereto) to perform the swivel movement. The spring 90 is proximally fastened to the mounting assembly 40, either directly, or indirectly (e.g., via the mounting portion 43).

In normal deployment, the spring 90 is compressed and the top portion of the upper set of arms of the linkage 12 is in contact with the mounting plate creating a solid, steel on steel ride. However, when the rail contact is lost, the spring 90 pushes the axle assembly 20 downwardly (i.e., it undergoes a vertical translation movement) to maintain a good contact with the rails. The upper part of the linkage 12 also acts as a lateral stopper to prevent any side to side "pendulum" effect when the hi-rail is not loaded. Linkage 12 makes contact with the mounting plate 40, both with the spring 90 fully compressed and fully decompressed.

FIG. 11 includes arrows of the movement performed by the spring 90 when the spring 90 is in a situation which allows it to expand, as it is a compression spring. For example, if the tires of the vehicle hit an obstacle which makes the vehicle slightly bump, the rail wheels of the axle assembly 12 may lose the contact with the rails, which is a safety hazard. This situation creates a space under the rail wheels and this space allows the spring 90 to spontaneously expand, thus making the suspension active as it can adapt to track conditions.

When the spring 90 expands, as shown in FIG. 11, the distal end of the spring 90, which is mounted on the swivable spring wall 91, is pushed outwardly with respect to the mounting wall 42.

The upper pivot connection 94 of the linkage 12 is closer to the swivel point 95 than the distal end of the spring 90, thus ensuring that the spring 90, when expanding, provides more substantial torque. It is also at a different angular position with respect to the swivel point 95, as shown in FIG. 11. Indeed, with respect to the swivel point 95, the upper pivot connection 94 of the linkage differs in angular position from the distal end of the spring in less than about a quarter of a circle, i.e., slightly less than 90° in angular difference. Other angles generally ranging between 45° and 135° can be considered, as long as the angular difference between the (first) angular position of the distal end of the spring 90 at the spring wall 91, with respect to the swivel connection 95 acting as the center of rotation, and the (second) angular position of the upper pivot connection 94 is more or less about 90° such that an outward movement of the distal end of the spring 90 results in a downward movement of the upper pivot connection 94 which holds the linkage 12.

This implies that when the distal end of the spring 90 is pushed outwardly from the mounting assembly 40 (in the exemplary figure, substantially toward the left), the upper pivot connection 94 of the linkage is pushed substantially downwardly. This provides the downward vertical translation of the axle assembly 20 which makes the suspension an active suspension and thus keeps the rail wheels in contact with the rails. This translation movement does not fold or unfold the linkage 12, but it moves the upper pivot connection 94 to which the linkage is (pivotally) connected thereby pushing it down, or lifting it up when the spring 90 eventually retracts.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A hi-rail device comprising:
   an axle assembly for holding wheels;
   a mounting assembly for mounting on a vehicle, the mounting assembly comprising
      a locking slot, the locking slot comprising a first locking end and a second locking end, a portion for mounting on the vehicle which is distinct from a wall comprising the locking slot, and a spring, positioned between the portion for mounting on the vehicle and the wall comprising the locking slot, to provide a suspension within the mounting assembly;
   a linkage between the axle assembly and the mounting assembly, the linkage being foldable and unfoldable to translate the axle assembly relative to the mounting assembly;
   a locking pin movable in translation within the locking slot; and
   a locking cylinder pivotally connected from an inclined arm, extending from the linkage to the locking pin, the locking cylinder comprising a spring to urge the locking pin into an abutting surface of any one of the first locking end and the second locking end when the locking pin is in any one of the first locking end or the second locking end, thereby locking the linkage.

2. The hi-rail device of claim 1, further comprising a deployment hydraulic cylinder which is connected from the axle assembly to a hinge of the linkage to unfold the linkage upon extension of the deployment hydraulic cylinder and to fold the linkage upon retraction of the deployment hydraulic cylinder.

3. The hi-rail device of claim 2, wherein the linkage comprises a first pair of arms and a second pair of arms defining the hinge on which the deployment hydraulic cylinder is connected, the linkage further comprising a third pair of arms, the third pair of arms comprising the inclined arm to which the locking cylinder is pivotally connected.

4. A hi-rail device comprising:
   an axle assembly for holding wheels, the axle assembly comprising a locking slot, the locking slot comprising a first locking end and a second locking end;
   a mounting assembly for mounting on a vehicle;
   a linkage between the axle assembly and the mounting assembly, the linkage being foldable and unfoldable to translate the axle assembly relative to the mounting assembly;
   a locking pin movable in translation within the locking slot;
   a locking cylinder pivotally connected from an inclined arm, extending from the linkage to the locking pin, the locking cylinder comprising a spring to urge the locking pin into an abutting surface of any one of the first locking end and the second locking end when the locking pin is in any one of the first locking end or the second locking end, thereby locking the linkage, and
   a suspension assembly between the mounting assembly and the linkage, the suspension assembly comprising walls to provide an upper pivot point for the linkage and a spring, positioned between the portion for mounting on the vehicle and the walls that provide the upper pivot point for the linkage, to provide a suspension within the mounting assembly.

5. The hi-rail device of claim 4, further comprising a deployment hydraulic cylinder which is connected from the axle assembly to a hinge of the linkage to unfold the linkage upon extension of the deployment hydraulic cylinder and to fold the linkage upon retraction of the deployment hydraulic cylinder.

6. The hi-rail device of claim 5, wherein the linkage comprises a first pair of arms and a second pair of arms defining the hinge on which the deployment hydraulic cylinder is connected, the linkage further comprising a third pair of arms, the third pair of arms comprising the inclined arm to which the locking cylinder is pivotally connected.

7. A hi-rail device comprising:
   a mounting assembly for mounting on a vehicle;
   a linkage between an axle assembly for holding wheels and the mounting assembly, the linkage being pivotally connected to an upper pivot connection thereof, and foldable and unfoldable to translate the axle assembly relative to the upper pivot connection;
   an active suspension between the linkage and the mounting assembly, the active suspension comprising:
      a suspension body which has a swivel connection to the mounting assembly to swivel thereabout;
      a spring proximally mounted on the mounting assembly and distally urging on the suspension body to provide the swivel about the swivel connection;
   the suspension body comprising the upper pivot connection to the linkage, which can move along with the suspension body to translate the linkage.

8. The hi-rail device of claim 7, wherein the spring is a compression spring urging the suspension body outwardly with respect to the mounting assembly.

9. The hi-rail device of claim 8, wherein the suspension body comprises a spring wall to which the spring is distally fastened for urging the suspension body outwardly with respect to the mounting assembly.

10. The hi-rail device of claim 9, wherein the suspension body further comprises side walls to which the spring wall is fastened, the side walls comprising the swivel connection to the mounting assembly.

11. The hi-rail device of claim 10, wherein the side walls comprise the upper pivot connection to the linkage.

12. The hi-rail device of claim 11, wherein the spring distally urges onto the spring wall at a first angular position with respect to a center of rotation at the swivel connection, the side walls comprising the upper pivot connection to the linkage at a second angular position with respect to the center of rotation at the swivel connection, wherein the second angular position is below the first angular position of about 45° to 135°, such that an outward movement of the spring wall causes a downward movement of the upper pivot connection to the linkage, thus actively pushing the linkage downwardly.

13. The hi-rail device of claim 12, wherein the axle assembly comprises a locking slot, the locking slot comprising a first locking end and a second locking end, the linkage comprising arms defining a hinge making the linkage foldable and unfoldable, at least one of the arms comprising an inclined arm portion extending away from the hinge of the linkage, the hi-rail device further comprising:
 a locking pin movable in translation within the locking slot;
 a locking cylinder pivotally connected to the inclined arm portion, extending from the linkage to the locking pin, the locking cylinder comprising a locking spring to urge the locking pin into an abutting surface of any one of the first locking end and the second locking end when the locking pin is in any one of the first locking end or the second locking end, thereby locking the linkage.

14. The hi-rail device of claim 13, wherein the at least one of the arms comprising the inclined arm portion comprises an opening for the locking pin that locks the at least one of the arms when the locking pin is locked.

15. The hi-rail device of claim 14, further comprising a deployment hydraulic cylinder which is connected from the axle assembly to the hinge of the linkage to unfold the linkage upon extension of the deployment hydraulic cylinder and to fold the linkage upon retraction of the deployment hydraulic cylinder.

16. The hi-rail device of claim 15, wherein the linkage comprises a first pair of arms and a second pair of arms defining the hinge on which the deployment hydraulic cylinder is connected, the linkage further comprising an additional arm belonging to the at least one of the arms comprising the inclined arm portion.

\* \* \* \* \*